(12) United States Patent
Fujita

(10) Patent No.: US 7,511,255 B2
(45) Date of Patent: Mar. 31, 2009

(54) SPECTROPHOTOMETER WITH OPTICAL SYSTEM FOR SPECTRALLY DISPERSING MEASUREMENT LIGHT AND PHOTODIODE ARRAY

(75) Inventor: Takeshi Fujita, Kyoto (JP)

(73) Assignee: Shimadzu Corporation (JP)

( * ) Notice: Subject to any disclaimer, the term of this patent is extended or adjusted under 35 U.S.C. 154(b) by 0 days.

(21) Appl. No.: 11/819,043

(22) Filed: Jun. 25, 2007

(65) Prior Publication Data

US 2008/0067328 A1    Mar. 20, 2008

(30) Foreign Application Priority Data

Sep. 15, 2006   (JP) .............................. 2006-250167

(51) Int. Cl.
*G01J 3/42* (2006.01)
(52) U.S. Cl. ..................... 250/208.1; 356/319; 356/320
(58) Field of Classification Search ............... 250/208.1; 356/319, 320
See application file for complete search history.

(56) References Cited

U.S. PATENT DOCUMENTS 4,758,085 A * 7/1988 Lequime et al. ............. 356/319
5,920,389 A * 7/1999 Bungo ........................ 356/325
6,084,669 A * 7/2000 Schmid ....................... 356/319

FOREIGN PATENT DOCUMENTS

| JP | 05-079451 A | 3/1993 |
| JP | 08-015013 A | 1/1996 |
| JP | 2000-065643 A | 3/2000 |

\* cited by examiner

*Primary Examiner*—Stephen Yam
(74) *Attorney, Agent, or Firm*—Sughrue Mion, PLLC

(57) ABSTRACT

A spectrophotometer, in which an emission spectrum of the light source is measured. Based on the measured emission spectrum, a threshold is set to allow only an outstanding spectral intensity in a specific wavelength region to be greater than the threshold. Then, a ratio between the setup threshold and a peak spectral intensity in the specific wavelength region greater than the threshold is calculated. Then, an electric-charge accumulation time for a light-receiving element corresponding to a wavelength region equal to or less than the threshold is set at an upper limit of electric-charge accumulation time causing no saturation in any light-receiving element. Based on the ratio between the threshold and the peak spectral intensity in the specific wavelength region greater than the threshold, an electric-charge accumulation time for the light-receiving element corresponding to the specific wavelength region greater than the threshold is set.

8 Claims, 5 Drawing Sheets

656nm

656nm

SPECTROPHOTOMETER WITH OPTICAL SYSTEM FOR SPECTRALLY DISPERSING MEASUREMENT LIGHT AND PHOTODIODE ARRAY

BACKGROUND OF THE INVENTION

1. Field of the Invention

The present invention relates to a spectrophotometer which comprises an optical system for spectrally dispersing measurement light, a photodiode array having a plurality of light-receiving elements arranged in corresponding relation to respective spectral light components dispersed by the optical system and each adapted to receive and photoelectrically convert a corresponding one of the spectral light components, a sample chamber disposed in a light path of the measurement light, and a signal readout section for reading out an amount of electric charge accumulated in each of the light-receiving elements of the photodiode array.

2. Description of the Related Art

In a spectrophotometer using a photodiode array having a plurality of light-receiving elements (photodiodes) arranged along a spectral direction, measurement light is spectrally dispersed into its light components with respect to each wavelength region through a wavelength dispersion element, and the spectral light components are entered into the corresponding light-receiving elements. In each of the light-receiving elements, an electric charge is generated and accumulated in an amount corresponding to an amount (i.e., intensity) of the received light component. In a readout operation, the electric charge accumulated in each of the photodiodes is sucked and detected so as to measure an amount of light component incident into each of the light-receiving elements.

A photodiode is saturated when a certain amount of electric charge is accumulated therein, and precluded from accumulating further electric charge. For this reason, an electric-charge accumulation time has heretofore been set in accordance with a specific one of the light-receiving elements which has the highest spectral intensity, to avoid the occurrence of saturation in all the light-receiving elements. In this technique of setting the electric-charge accumulation time in accordance with the specific light-receiving element having the highest spectral intensity, an amount of electric charge to be accumulated in each of the remaining light-receiving elements corresponding to other wavelength regions having relatively low spectral intensities is significantly reduced, and thereby signal strengths in these wavelength regions are lowered.

In the signal readout operation, a readout noise level is constant irrespective of electric-charge accumulation amounts. That is, the lowered signal strength leads to an increase in noise-to-signal ratio which causes larger measurement errors. Thus, in view of reducing the noise-to-signal ratio to suppress measurement errors, it is desirable to allow each of the light-receiving elements to accumulate an electric charge up to an amount closest to its saturation level so as to provide a higher signal strength.

With a view to reducing noises over the entire wavelength range in absorption spectrum measurements, there has been proposed a technique of changing an electric-charge accumulation time for each of a plurality of light-receiving elements in accordance with a background spectrum (i.e., a spectrum of a light source when no sample is set in a sample chamber) by use of a control circuit for independently controlling respective switching cycles of a plurality of readout switches each associated with a corresponding one of the light-receiving elements, so as to allow each of the light-receiving elements to have a different electric-charge accumulation time [see, for example, JP 08-015013A].

This technique is designed to reduce an electric-charge accumulation time for the light-receiving element corresponding to a wavelength region with a relatively high spectral intensity in an emission spectrum of a light source, and increase an electric-charge accumulation time for the light-receiving element corresponding to a wavelength region with a relatively low spectral intensity in the emission spectrum of the light source. Thus, signal strengths in all the wavelength regions can be uniformed. On the other hand, this technique has a problem about structural complication and high cost of the control circuit for independently controlling the switching cycles of the readout switches of the light-receiving elements, due to the need for calculating and setting an electric-charge accumulation time for each of the light-receiving elements, based on the spectrum intensity of the light source and a target spectral intensity.

An ultraviolet (UV)-visible spectrophotometer has a measurement wavelength range of 190 to 1100 nm. In order to cover this wavelength length, the UV-visible spectrophotometer typically employs a light source comprising a deuterium lamp (hereinafter referred to as "D2 lamp") and a tungsten halogen lamp (hereinafter referred to as "W lamp") which are designed to be simultaneously turned on. A spectral characteristic of the light source, i.e., a combination of the D2 lamp and the W lamp, is not flat, and, in particular, the D2 lamp has an outstanding bright-line wavelength. Thus, when the D2 lamp and the W lamp are simultaneously turned on, a bright line at 656 nm exhibits a maximum spectral intensity in the visible region, and a light-receiving element corresponding to this wavelength region will be first saturated. While it is contemplated to lower a spectral intensity of the W lamp so as to avoid saturation of the light-receiving element, the use of the W lamp with such a lowered spectral intensity will spoil an intended advantage of simultaneously turning on the D2 lamp and the W lamp.

From this point of view, there has been proposed a technique of lowering an intensity of incident spectrum to a light-receiving element corresponding to a wavelength region exhibiting an outstanding spectral intensity by use of a light intensity-reducing filter provided on the side of a light-receiving surface of a photodiode array [see, for example, JP 05-079451A].

In this technique, for example, when a D2 lamp and a W lamp as a light source are simultaneously turned on, an amount of light to be received by a light-receiving element corresponding to a bright-line wavelength region around 656 nm having a peak in an emission spectrum of the light source is reduced by the light intensity-reducing filter. This makes it possible to extend a time period before saturation occurs in any one of a plurality of light-receiving elements of a photodiode array, so as to increase signal strengths of the remaining light-receiving elements corresponding to wavelength regions other than that subjected to the filter.

In the use of the light source comprising the D2 and W lamps, the highest spectral intensity is exhibited in a wavelength region of 656±4 nm. Thus, a reduction in amount of electric charge to be accumulated in a specific one of a plurality of light-receiving elements which corresponds to this wavelength region allows each of the remaining light-receiving elements corresponding to other wavelength regions to have an increased signal strength and a reduced noise-to-signal ratio. In the technique based on the light intensity-reducing filter, due to restrictions in processing accuracy, positioning accuracy, adjustment tolerance, etc., it is practically obliged to use a wide-range light intensity-reducing filter covering several light-receiving elements corresponding to a wavelength range of about 656±20 nm. Consequently, as shown in FIG. 6, a light intensity is reduced in an excessively wide wavelength range to undesirably lower a spectral intensity.

SUMMARY OF THE INVENTION

In view of the above circumstances, it is an object of the present invention to provide a technique of reducing an amount of electric charge to be accumulated in a light-receiving element susceptible to saturation so as to avoid the occurrence of saturation therein, without lowering a signal strength of the light-receiving element in an excessively wide wavelength range.

In order to achieve this object, according to a first aspect of the present invention, there is provided a spectrophotometer which comprises a light source, an optical system for spectrally dispersing measurement light from the light source, a light-receiving unit and a control section. The light-receiving unit includes a photodiode array having a plurality of light-receiving elements arranged in corresponding relation to respective spectral light components dispersed by the optical system and each adapted to receive and photoelectrically convert a corresponding one of the spectral light components, a sampling chamber disposed in a light path of the measurement light, and a signal readout section for reading out an amount of electric charge accumulated in each of the light-receiving elements of the photodiode array. The light-receiving unit is designed to controllably set an electric-charge accumulation time for each of the light-receiving elements of the photodiode. The control section is operable to control the light-receiving unit to set respective electric-charge accumulation times for the light-receiving elements of the photodiode array, in such a manner as to relatively reduce an electric-charge accumulation time for one of the light-receiving elements which corresponds to a specific wavelength region exhibiting a spectral intensity greater than a predetermined threshold, in an emission spectrum of the light source.

Preferably, the control section is operable, based on a ratio between the threshold and a peak spectral intensity in the specific wavelength region exhibiting a spectral intensity greater than the threshold, to solely reduce an electric-charge accumulation time for the light-receiving element corresponding to the specific wavelength region, relative to respective electric-charge accumulation times for the remaining light-receiving elements.

The light source may be designed to generate measurement light which has a bright-line wavelength region existing as a peak in an emission spectrum within a measurement wavelength range. In this case, the threshold is preferably set to allow only a spectral intensity in the bright-line wavelength region to be greater than that.

The above light source may comprise a deuterium lamp and a tungsten halogen lamp which are designed to be simultaneously turned on. In this case, the bright-line wavelength region is may be a narrow range having a center wavelength of 656 nm, for example, a wavelength range of 656±4 nm.

According to a second aspect of the present invention, there is provided a measurement method using a spectrophotometer which comprises: a light source; an optical system for spectrally dispersing light from the light source; and a light-receiving unit including a photodiode array having a plurality of light-receiving elements arranged in corresponding relation to respective spectral light components dispersed by the optical system and each adapted to receive and photoelectrically convert a corresponding one of the spectral light components, and a signal readout section for reading out an amount of electric charge accumulated in each of the light-receiving elements of the photodiode array. The measurement method comprises allowing the readout section of the light-receiving unit to controllably set an electric-charge accumulation time for each of the light-receiving elements of the photodiode array, measuring an emission spectrum of the light source under the condition that no sample is set in the spectrophotometer, setting a threshold based on the measured emission spectrum, and controlling the readout section to relatively reduce an electric-charge accumulation time to be set for one of the light-receiving elements which corresponds to a specific wavelength region exhibiting a spectral intensity greater than the threshold, in the measured emission spectrum.

Preferably, the measurement method of the present invention includes controlling the readout section to, based on a ratio between the threshold and a peak spectral intensity in the specific wavelength region exhibiting a spectral intensity greater than the threshold, solely reduce an electric-charge accumulation time for the light-receiving element corresponding to the specific wavelength region, relative to respective electric-charge accumulation times for the remaining light-receiving elements.

In the spectrophotometer and measurement method of the present invention, the light-receiving unit is designed to controllably set an electric-charge accumulation time for each of the light-receiving elements of the photodiode array, and an electric-charge accumulation time for one of the light-receiving elements corresponding to a specific wavelength region exhibiting a spectral intensity greater than a predetermined threshold, in the measured emission spectrum, is relatively reduced. Thus, an amount of electric charge to be accumulated in the light-receiving element corresponding to the wavelength region having a spectral intensity greater than the threshold is relatively reduced to lower the risk of saturation in this light-receiving element. This makes it possible to increase an electric-charge accumulation time for each of the remaining light-receiving elements corresponding to respective wavelength regions other than the specific wavelength region, as compared with the conventional techniques, so as to increase a signal strength and lower a noise-to-signal ratio in each of the remaining light-receiving elements.

In the spectrophotometer and measurement method of the present invention, based on a ratio between the threshold and a peak spectral intensity in the specific wavelength region exhibiting a spectral intensity greater than the threshold, in the emission spectrum, an electric-charge accumulation time for the light-receiving element corresponding to the specific wavelength region exhibiting a spectral intensity greater than a predetermined threshold may be solely reduced relative to respective electric-charge accumulation times for the remaining light-receiving elements. This makes it possible to eliminate an undesirable situation where an electric-charge accumulation time for the wavelength region exhibiting greater than the threshold is set at an excessively reduced value, so as to maximally utilize the emission spectrum of the light source.

In addition, the control of solely reducing an electric-charge accumulation time for the light-receiving element corresponding to the specific wavelength region exhibiting a spectral intensity greater than a predetermined threshold, allows respective electric-charge accumulation times for the remaining light-receiving elements to be uniformly set. This makes it possible to simplify a control logic or circuit as compared with a configuration for setting the electric-charge accumulation time for each of the light-receiving elements.

Further, in the spectrophotometer and measurement method of the present invention, the light source may be designed to generate light which has a bright-line wavelength region existing as a peak in an emission spectrum within a measurement wavelength range, and the threshold may be set to allow only a spectral intensity in the bright-line wavelength region to be greater than that. This makes it possible to relatively reduce only an electric-charge accumulation time for the light-receiving element corresponding to the bright-line wavelength region having an outstanding spectral strength so as to lower sensitivity thereof, without lowering sensitivities of the remaining light-receiving elements corresponding to respective wavelength regions other than the bright-line wavelength region.

Other features and advantages of the present invention will be apparent from the accompanying drawings and from the detailed description.

BRIEF DESCRIPTION OF THE DRAWINGS

FIGS. 3A and 3B are graphs showing emission spectra of a light source comprising a D2 lamp and a W lamp, in the spectrophotometer, wherein FIG. 3A shows an emission spectrum (solid line) of the D2 lamp and an emission spectrum (broken line) of the W lamp, and FIG. 3B shows an emission spectrum of a combination of the D2 and W lamps which are simultaneously turned on.

DESCRIPTION OF THE PREFERRED EMBODIMENTS

Figure 1:
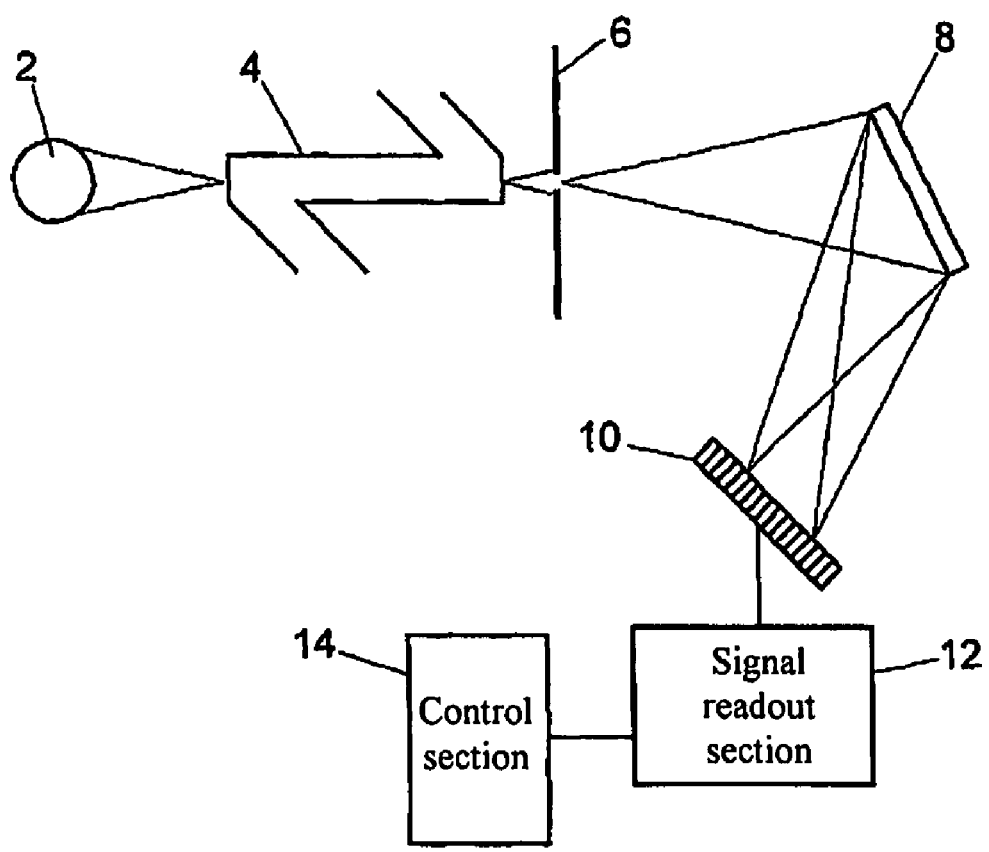
FIG. 1 is a block diagram schematically showing a spectrophotometer according to one embodiment of the present invention.

FIG. 1 is a schematic block diagram showing a spectrophotometer according to one embodiment of the present invention, wherein the spectrophotometer is used for a liquid chromatography measurement.

In this embodiment, the spectrophotometer is designed such that measurement light is emitted from a light source 2 comprising a D2 lamp and a W lamp, to a flow cell (sample chamber) 4 having therein a flow of an eluate from a liquid-chromatographic column, so as to measure an absorbance. The light transmitted through the flow cell 4 is formed as a line-shaped beam through a slit 6. Then, the line-shaped beam is spectrally dispersed into its light components with respect to each wavelength region through a wavelength dispersion element 8, and the spectral light components are entered into a photodiode array 10. The photodiode array 10 comprises a plurality of light-receiving elements each composed of a photodiode and arranged in corresponding relation to respective spectral light components from the wavelength dispersion element 8. Thus, each of the light-receiving elements can receive the light component in a corresponding one of a plurality of wavelength regions. In response to receiving the spectral light components, each of the light-receiving elements of the photodiode array 10 is operable to photoelectrically convert the received spectral light component so as to generate an electric charge, and accumulate the electric charge in an amount corresponding to an amount of the received spectral light component. The electric charge accumulated in each of the light-receiving elements will be read out by a signal readout section 12. The photodiode array 10 and the signal readout section 12 constitute a light-receiving unit. A signal readout operation of the signal readout section 12 is controlled by a control section 14.

In this embodiment, the light-receiving unit is designed to changeably set an electric-charge accumulation time for each of the light-receiving elements of the photodiode array 10 under control of the control section 14. For example, a CMOS linear image sensor S 10111 to S10114 series produced by Hamamatsu Photonics K.K., may be used as the light-receiving unit.

The light-receiving unit will be specifically described below.

In this embodiment, the signal readout section 12 of the light-receiving unit is operable to sequentially read out (scan) signals from all the light-receiving elements of the photodiode array 10 with a constant cycle. Only a signal read out by a specific one of a predetermined number of scans is handled as valid data by the signal readout section 12, and other signals read out by the remaining scans are discarded. In the following description, a scan operation for reading out a signal to be handled as valid data, and a scan operation for reading out a signal to be discarded, will be referred to as "valid scan" and "invalid scan", respectively. A signal readout operation in the signal readout section 12, i.e., the scan operation and a handling of a signal read out by the scan operation, is controlled by the control section 14.

With reference to FIGS. 4A to 4D, one example of the signal readout operation will be described below. FIGS. 4A to 4D are time charts showing the signal readout operation and an electric-charge accumulation operation in each of the light-receiving elements of the photodiode array 10.

Every time a start signal from the control section 14 has a High level, the signal readout section 12 sequentially outputs readout signals to the photodiode array 10 to controllably turn on/off the photodiodes. The output of the readout signals from the signal readout section 12 is controlled by the control section 14.

When the readout signal from the signal readout section 12 is set at a High level, each of the light-receiving elements can continuously accumulate an electric charge. By contrast, when the readout signal from the signal readout section 12 is set at a Low level, each of the light-receiving elements is turned on to release an accumulated electric charge therefrom. In the example illustrated in FIGS. 4A to 4D, a valid scan is performed once per four scans. Each of the remaining three scans is an invalid scan, and a signal read out by the invalid scan is discarded as invalid data.

Figure 4A:
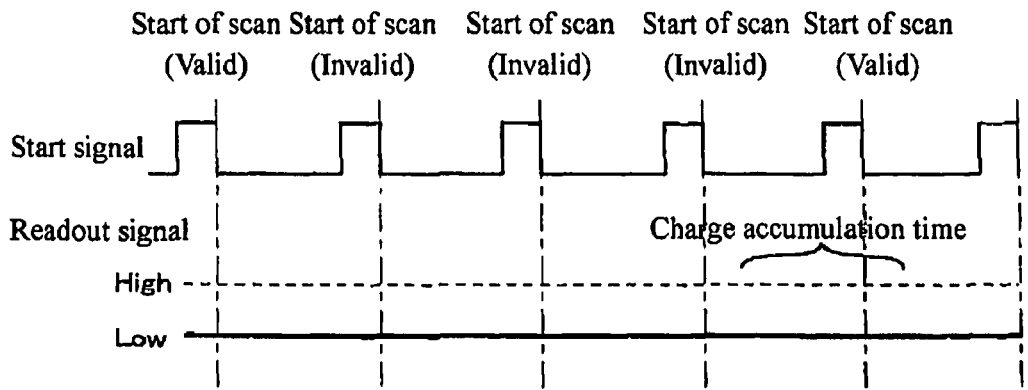
FIGS. 4A to 4D are timing charts of a signal readout operation in a signal readout section.

After the start signal input from the control section 14 into the signal readout section 12 initially has the High level, a 1st signal readout is performed in a light-receiving element A illustrated in FIG. 4A. The readout signal for this light-receiving element A is constantly set at the Low level through the entire scan operation, and thereby an accumulated electric charge is released and discarded every time an invalid scan is performed. Thus, a signal to be read out during a valid scan is an electric charge accumulated in a time period from the end of an invalid scan (3rd invalid scan) just before the valid scan through until the start of the valid scan. That is, an electric-charge accumulation time for the light-receiving element A is the time period from the end of the 3rd invalid scan just before the valid scan through until the start of the valid scan.

Figure 4B:
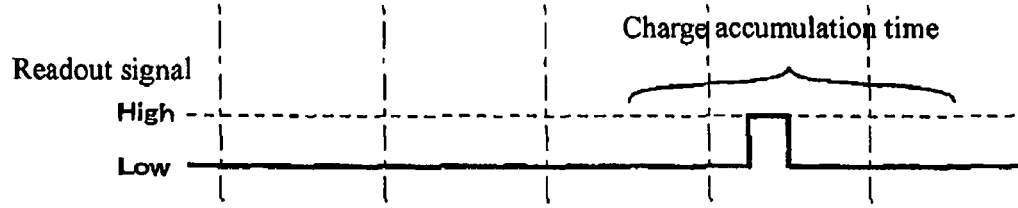

A 2nd signal readout just after the 1st signal readout in the light-receiving element A is performed in a light-receiving element B illustrated in FIG. 4B. In this light-receiving element B, the readout signal from the signal readout section 12 is set at the High level during an invalid scan (3rd invalid scan) just before the valid scan, and thereby no signal is read out during the invalid scan just before the valid scan. Therefore, an electric charge is continuously accumulated in a time period from the end of a 2nd invalid scan through until the start of the valid scan. That is, the light-receiving element B has an electric-charge accumulation time which is two times greater than that for the light-receiving element A.

Figure 4C:
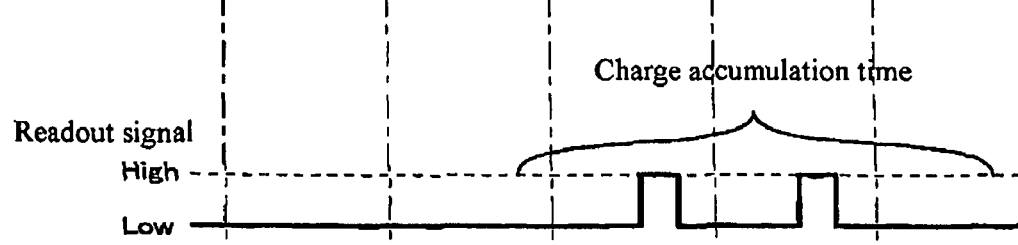

A 3rd signal readout just after the 2nd signal readout in the light-receiving element B is performed in a light-receiving element C illustrated in FIG. 4C. In this light-receiving element C, while the readout signal from the signal readout section 12 is maintained at the low level during an invalid scan (1st invalid scan) just after the last valid scan (left side in FIGS. 4A to 4D), the readout signal is set at the High level during subsequent invalid scans (2nd and 3rd invalid scans), and thereby no signal is read out during the two 2nd and 3rd invalid scans before a valid scan. That is, the light-receiving element C has an electric-charge accumulation time which is three times greater than that for the light-receiving element A.

Figure 4D:
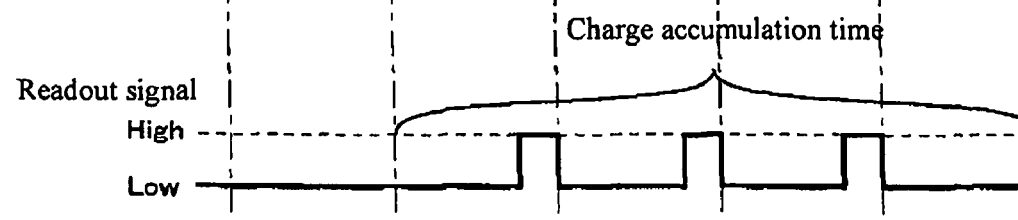
Figure 5:
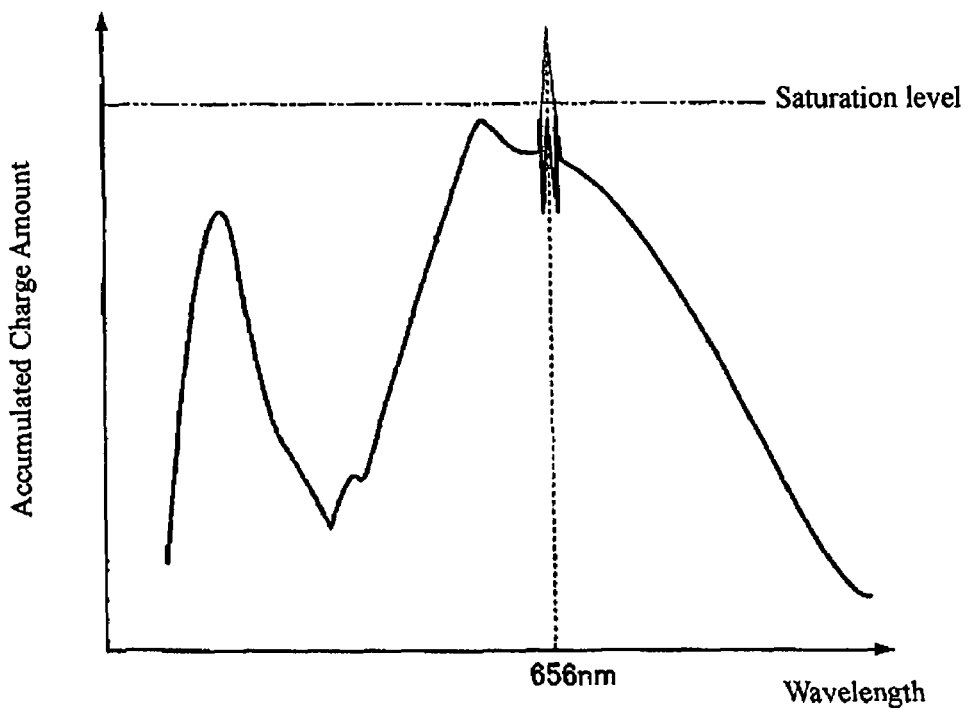
FIG. 5 is a graph showing an energy distribution in the photodiode array after setting of the electric-charge accumulation times.

After the start signal input from the control section 14 into the signal readout section 12 initially has the High level, the 4th, i.e., last, signal readout in one cycle is performed in a light-receiving element D illustrated in FIG. 4D. In this light-receiving element C, the readout signal from the signal readout section 12 is set at the High level during all invalid scans (1st to 3rd invalid scans), and thereby an electric charge is continuously accumulated in a time period from the end of the last valid scan through until the start of a valid scan. That is, the light-receiving element B has an electric-charge accumulation time which is four times greater than that for the light-receiving element A.

Figure 2:
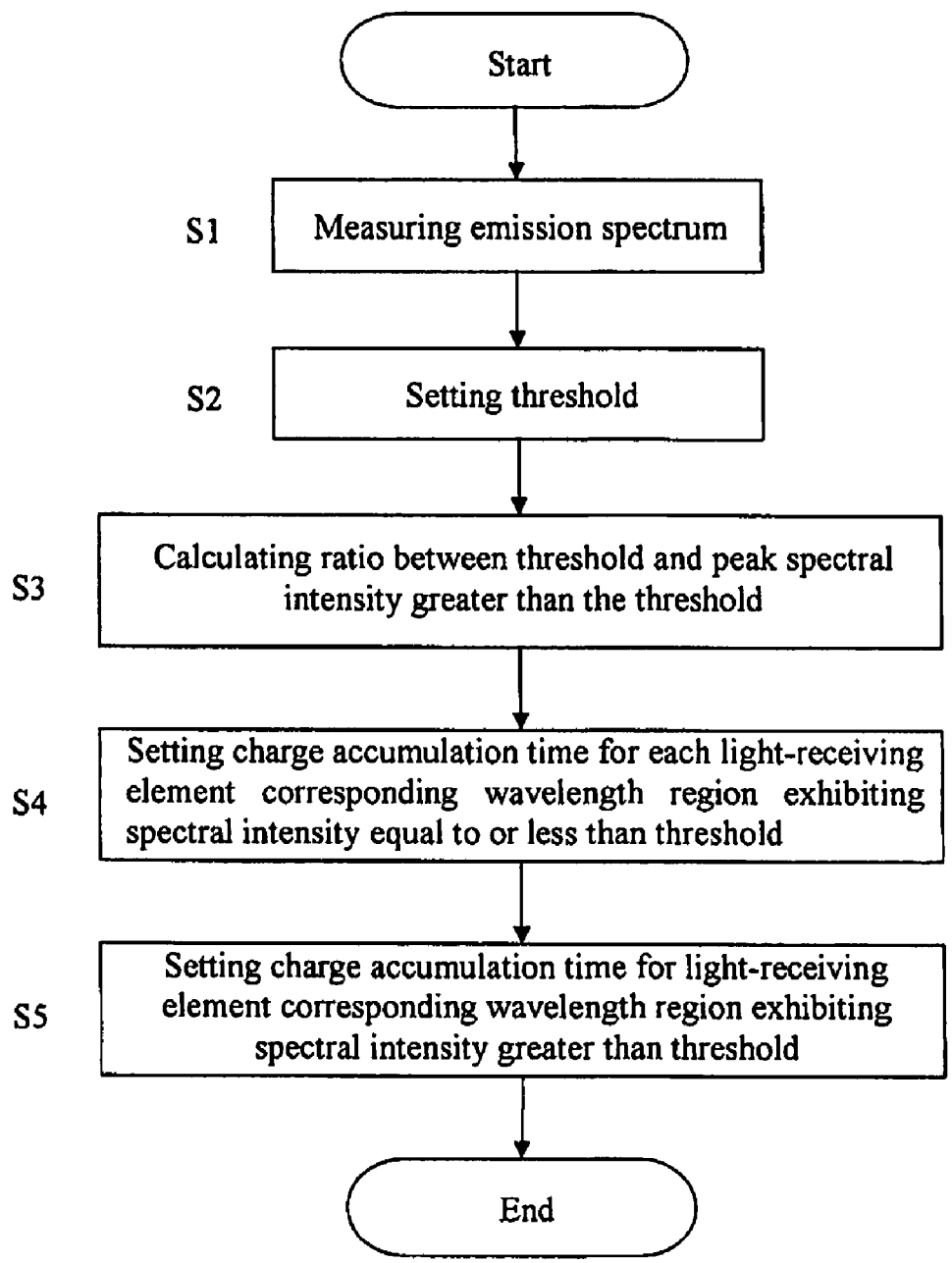
FIG. 2 is a flowchart showing one example of a process of setting an electric-charge accumulation time for each of a plurality of light-receiving elements of a photodiode array of a light-receiving unit in the spectrophotometer.

With reference to FIG. 2, a process of setting an electric-charge accumulation time for each of the light-receiving elements of the photodiode array 10 will be described below. FIG. 2 is a flowchart showing the process of setting an electric-charge accumulation time for each of the light-receiving elements.

An emission spectrum of the light source 2 is measured (Step S1). In this measurement, an electric-charge accumulation time for each of the light-receiving elements is temporarily set to allow all the photodiodes to avoid the occurrence of salutation therein. The measured emission spectrum of the light source 2 is stored in a storage device (not shown) or the like. Based on the measured emission spectrum of the light source 2, a threshold is set in such a manner as to allow only an outstanding spectral intensity in a specific wavelength region to be greater than that (Step S2). Then, a ratio between the setup threshold and a peak spectral intensity in the specific wavelength region exhibiting a spectral intensity greater than the threshold is calculated (Step S3). Further, an electric-charge accumulation time for each of the light-receiving elements (except one light-receiving element corresponding to the specific wavelength region) corresponding to respective wavelength regions each exhibiting a spectral intensity equal to or less than the threshold is uniformly set at an upper limit of electric-charge accumulation time causing no saturation, i.e., capable of preventing an amount of electric charge to be accumulated from exceeding an electric-charge capacity of each of all the light-receiving elements (Step S4). Based on the ratio between the threshold and the peak spectral intensity in the specific wavelength region greater than the threshold, an electric-charge accumulation time for the light-receiving element corresponding to the specific wavelength region exhibiting a spectral intensity greater than the threshold is set (Step S5).

The control section 14 is operable to automatically perform the operations of Steps S3 to S5 in FIG. 2, so as to control the readout signal to be output from the signal readout section 12, based on the setup electric-charge accumulation times for the light-receiving elements.

The process of setting an electric-charge accumulation time for each of the light-receiving elements of the photodiode array 10 will be more specifically described below, based on an example where a light source designed to simultaneously turn in a D2 lamp and a W lamp is used as the light source 2.

Figure 3A:
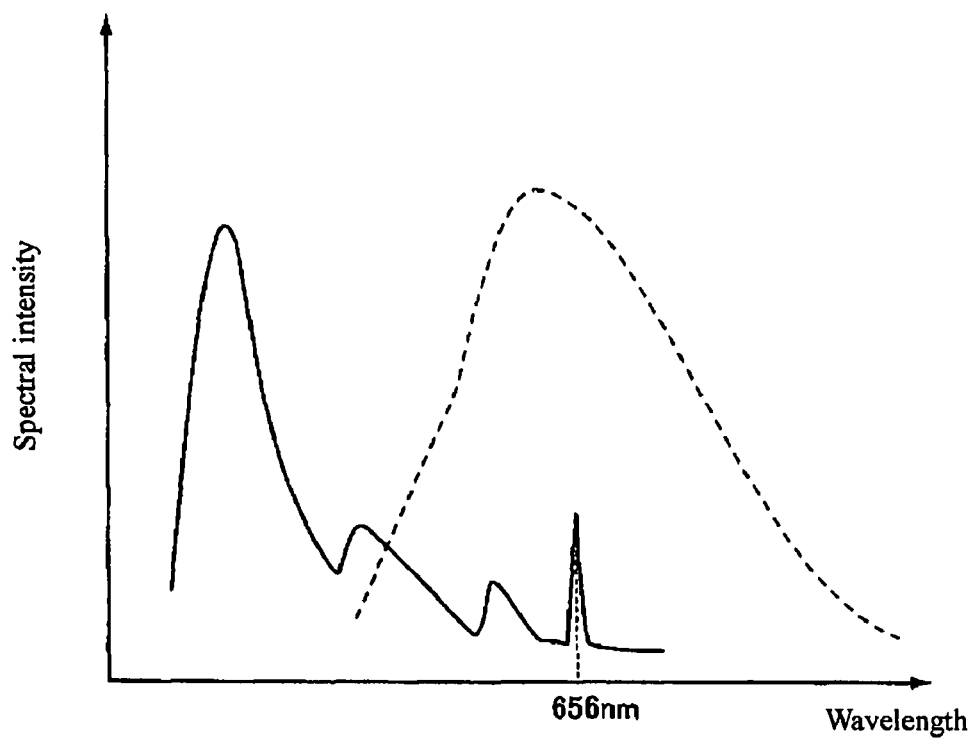
Figure 3B:
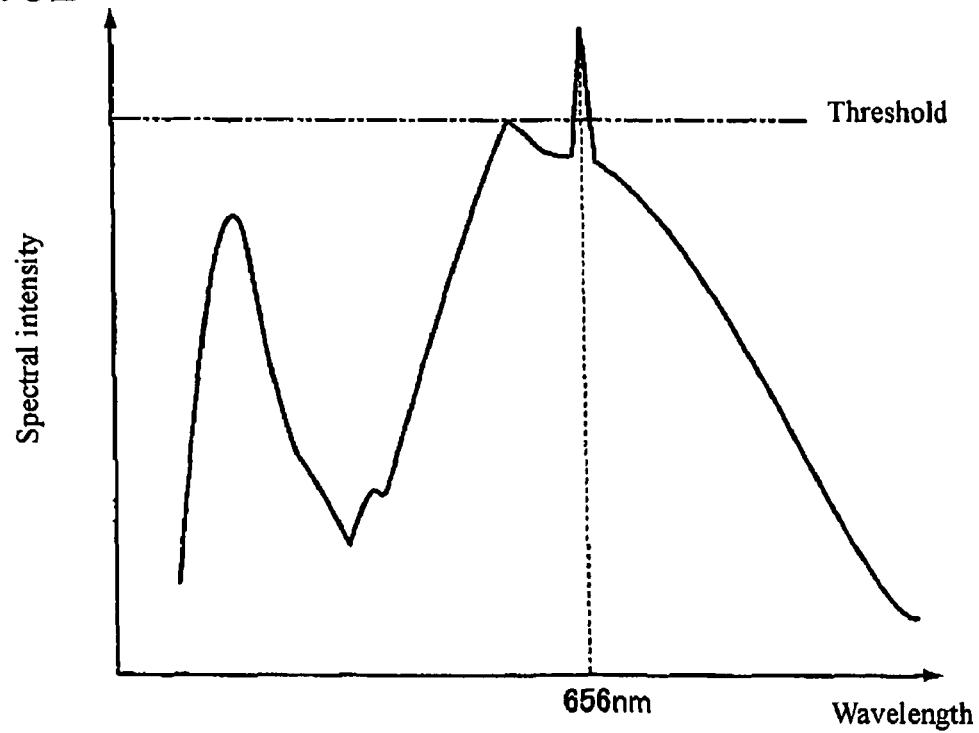

FIGS. 3A and 3B are graphs showing emission spectra of the light source 2, wherein FIG. 3A shows an emission spectrum (solid line) of the D2 lamp and an emission spectrum (broken line) of the W lamp, and FIG. 3B shows an emission spectrum of a combination of the D2 and W lamps which are simultaneously turned on. In FIGS. 3A and 3B, the vertical axis represents a spectral intensity, and the horizontal axis represents a wavelength.

When the D2 lamp and the W lamp are simultaneously turned on to cover a wavelength range of 190 to 1100 nm, respective spectra of the D2 and the W lamps are combined together to form a synthetic spectrum having a peak spectral intensity at 656 nm which is a bright-line wavelength of the D2 lamp. In this emission spectrum, a bright-line wavelength having an outstanding spectral intensity exists around 656 nm, and one of the light-receiving elements which corresponds to this specific wavelength region will be first saturated.

Thus, as indicated by the two-dot chain line in FIG. 3B, a threshold is set in such a manner to allow only an outstanding spectral intensity in the narrow bright-line wavelength region having a center wavelength of 656 nm to be greater than that.

After setting the threshold, the control section 14 is operable to identify one of the light-receiving elements which corresponds to the specific wavelength region around 656 nm exhibiting a spectral intensity greater than the threshold. Further, the control section 14 is operable to determine an upper limit of electric-charge accumulation time causing no saturation in the light-receiving element corresponding to the specific wavelength region exhibiting a spectral intensity greater than the threshold, and uniformly set the determined electric-charge accumulation time, as respective electric-charge accumulation times for the remaining light-receiving elements other than the identified light-receiving element.

Then, the control section 14 is operable, based on a ratio between the threshold and the spectral intensity at 656 nm, and the uniformly-set electric-charge accumulation time for each of the remaining light-receiving elements, to set an electric-charge accumulation time for the light-receiving element corresponding to the specific wavelength region around 656 nm. That is, the light-receiving element corresponding to the specific wavelength region around 656 nm is set in such a manner that a ratio between the electric-charge accumulation time for the light-receiving element corresponding to the specific wavelength region around 656 nm and the electric-charge accumulation time for each of the remaining light-receiving element becomes equal to or close to an inverse ratio of the ratio between the threshold and the spectral intensity at 656 nm. In this manner, a signal strength of the light-receiving element corresponding to the specific wavelength region around 656 nm can be set almost at a maximum level while avoiding the occurrence of saturation, so as to maximally utilize the emission spectrum of the light source.

Figure 6:
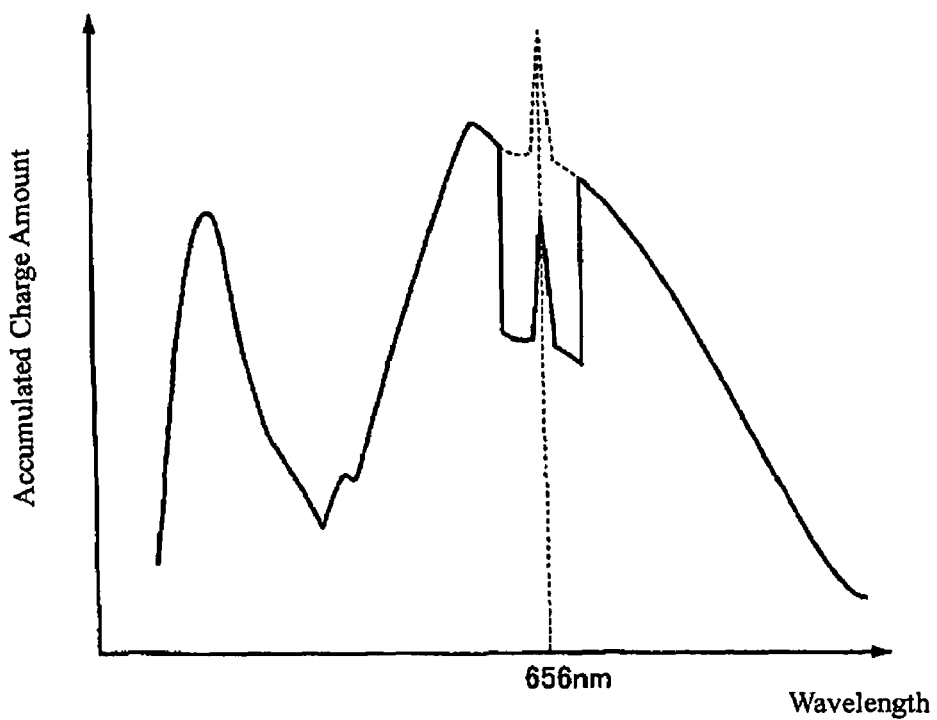
FIG. 6 is a graph showing an emission spectrum corrected according to a conventional technique.

As above, in the spectrophotometer according to this embodiment, an electric-charge accumulation time for the light-receiving element corresponding to a narrow wavelength region having a center frequency of 656 nm, e.g., a wavelength region of 656±4 nm, is solely reduced relative to the remaining light-receiving elements. Thus, the electric-charge accumulation time for each of the remaining light-receiving elements other than light-receiving element corresponding to a narrow wavelength region having a center frequency of 656 nm can be set at a relatively larger value as a while to increase signal strengths thereof. In addition, an electric-charge accumulation time for each of the light-receiving elements is minimally reduced based on the emission spectrum. This makes it possible to effectively utilize the emission spectrum of the light source without lowering a signal strength of the light-receiving element in an excessively wide wavelength range as shown in FIG. 6, i.e., as in the conventional technique using the light intensity-reducing filter.

An advantageous embodiment of the invention has been shown and described. It is obvious to those skilled in the art that various changes and modifications may be made therein without departing from the spirit and scope thereof as set forth in appended claims.

For example, while the present invention has been described based on the specific embodiment using the light source 2 comprising a D2 lamp and a W lamp, the light source for use in the present invention is not limited to such a type, but any other suitable type, such as a xenon flash lamp, may be used.

What is claimed is:

1. A spectrophotometer comprising:
    a light source;
    an optical system for spectrally dispersing measurement light from said light source;
    a light-receiving unit which includes a photodiode array having a plurality of light-receiving elements arranged in corresponding relation to respective spectral light components dispersed by said optical system and each adapted to receive and photoelectrically convert a corresponding one of said spectral light components, a sampling chamber disposed in a light path of the measurement light, and a signal readout section for reading out an amount of electric charge accumulated in each of said light-receiving elements of said photodiode array, said light-receiving unit being designed to controllably set an electric-charge accumulation time for each of said light-receiving elements of said photodiode array; and
    a control section for controlling said light-receiving unit to set respective electric-charge accumulation times for said light-receiving elements of said photodiode array, said control section being operable to relatively reduce an electric-charge accumulation time for one of said light-receiving elements which corresponds to a specific wavelength region in an emission spectrum of said light source, said specific wavelength region exhibiting a spectral intensity greater than a predetermined threshold,
    wherein said one of said light-receiving elements which corresponds to said specific wavelength region is determined based on a previous emission of light.

2. The spectrophotometer as defined in claim 1, wherein said control section is operable, based on a ratio between said threshold and a peak spectral intensity in said specific wavelength region exhibiting a spectral intensity greater than said threshold, to and solely reduce an electric-charge accumulation time for said light-receiving element corresponding to said specific wavelength region, relative to respective electric-charge accumulation times for the remaining light-receiving elements.

3. The spectrophotometer as defined in claim 2, wherein said light source is designed to generate measurement light which has a bright-line wavelength region existing as a peak in an emission spectrum within a measurement wavelength range, wherein said threshold is set to allow only a spectral intensity in said bright-line wavelength region to be greater than that.

4. The spectrophotometer as defined in claim 3, wherein said light source comprises a deuterium lamp and a tungsten halogen lamp which are designed to be simultaneously turned on, wherein said bright-line wavelength region has a center wavelength of 656 nm.

5. The spectrophotometer as defined in claim 1, wherein said electric-charge accumulation time for said one of said light-receiving element corresponding to said specific wavelength region is reduced based on an inverse of said ratio between said threshold and said peak spectral intensity in said specific wavelength region.

6. A measurement method using a spectrophotometer which includes: a light source; an optical system for spectrally dispersing light from said light source; and a light-receiving unit having a photodiode array having a plurality of light-receiving elements arranged in corresponding relation to respective spectral light components dispersed by said optical system and each adapted to receive and photoelectrically convert a corresponding one of said spectral light components, and a signal readout section for reading out an amount of electric charge accumulated in each of said light-receiving elements of said photodiode array, said measurement method comprising:
    allowing said signal readout section of said light-receiving unit to controllably set an electric-charge accumulation time for each of said light-receiving elements of said photodiode array;
    measuring an emission spectrum of said light source under the condition that no sample is set in said spectrophotometer;
    setting a threshold based on said measured emission spectrum; and
    controlling said signal readout section to relatively reduce an electric-charge accumulation time to be set for one of said light-receiving elements which corresponds to a specific wavelength region in said measured emission spectrum, said specific wavelength region exhibiting a spectral intensity greater than said threshold,
    wherein said one of said light-receiving elements which corresponds to said specific wavelength region is determined based on a previous emission of light.

7. The measurement method as defined in claim 6, which includes controlling said signal readout section to, based on a ratio between said threshold and a peak spectral intensity in said specific wavelength region exhibiting a spectral intensity greater than said threshold, solely reduce an electric-charge accumulation time for said light-receiving element corresponding to said specific wavelength region, relative to respective electric-charge accumulation times for the remaining light-receiving elements.

8. The measurement method as defined in claim 6, wherein said electric-charge accumulation time for said one of said light-receiving element corresponding to said specific wavelength region is reduced based on an inverse of said ratio between said threshold and said peak spectral intensity in said specific wavelength region.

* * * * *